US010840785B2

(12) United States Patent
McEwan

(10) Patent No.: US 10,840,785 B2
(45) Date of Patent: Nov. 17, 2020

(54) METHOD FOR FABRICATING BRUSHLESS MOTOR WINDINGS

(71) Applicant: Digital Aerolus, Inc., Shawnee, KS (US)

(72) Inventor: Ian J. McEwan, Pasadena, CA (US)

(73) Assignee: Digital Aerolus, Inc., Shawnee, KS (US)

( * ) Notice: Subject to any disclaimer, the term of this patent is extended or adjusted under 35 U.S.C. 154(b) by 227 days.

(21) Appl. No.: 15/807,183

(22) Filed: Nov. 8, 2017

(65) Prior Publication Data

US 2018/0131259 A1 May 10, 2018

Related U.S. Application Data

(60) Provisional application No. 62/419,320, filed on Nov. 8, 2016.

(51) Int. Cl.

| | |
|---|---|
| *H02K 15/095* | (2006.01) |
| *H02K 15/04* | (2006.01) |
| *H02K 3/18* | (2006.01) |
| *H02K 15/00* | (2006.01) |
| *H02K 3/28* | (2006.01) |
| *H02K 15/06* | (2006.01) |
| *B33Y 80/00* | (2015.01) |

(52) U.S. Cl.
CPC ............ *H02K 15/095* (2013.01); *B33Y 80/00* (2014.12); *H02K 3/18* (2013.01); *H02K 3/28* (2013.01); *H02K 15/00* (2013.01); *H02K 15/0407* (2013.01); *H02K 15/0478* (2013.01); *H02K 15/065* (2013.01); *Y10T 29/4906* (2015.01); *Y10T 29/49009* (2015.01); *Y10T 29/49062* (2015.01)

(58) Field of Classification Search
CPC .. H02K 15/00; H02K 15/0407; H02K 15/095; H02K 3/18; H02K 3/28; H02K 15/0478; H02K 15/065; Y10T 29/49009; Y10T 29/4906; Y10T 29/49062; B33Y 80/00
See application file for complete search history.

(56) References Cited

U.S. PATENT DOCUMENTS

| | | | |
|---|---|---|---|
| 4,691,746 A | * | 9/1987 | Sedgewick ....... Y10T 29/49009 140/92.1 |
| 5,336,956 A | | 8/1994 | Haner |
| 7,843,102 B1 | | 11/2010 | Wyremba |

(Continued)

FOREIGN PATENT DOCUMENTS

| | | | |
|---|---|---|---|
| JP | 2006271121 A | * | 10/2006 |
| WO | 2016/110549 A1 | | 7/2016 |

OTHER PUBLICATIONS

Search Report and Written Opinion for related PCT Patent Application No. PCT/US2017/060681 dated Jan. 22, 2018, 14 pages.

*Primary Examiner* — A. Dexter Tugbang
(74) *Attorney, Agent, or Firm* — Hovey Williams LLP

(57) ABSTRACT

Methods of assembling motor windings comprising wrapping windings around a central longitudinal axis in a cylindrical shape having a plurality of annularly spaced positions such that the windings form "n" and/or "u" shapes around the positions. As the windings encircle the longitudinal axis, they are wrapped in an outward spiral or inward spiral such that each pass of the windings is stacked on a previous pass.

7 Claims, 5 Drawing Sheets

(56) References Cited

U.S. PATENT DOCUMENTS

| | | |
|---|---|---|
| 2006/0220488 A1 | 10/2006 | Koike et al. |
| 2007/0182266 A1 | 8/2007 | Nashiki et al. |
| 2008/0191574 A1 | 8/2008 | Tokizawa |
| 2010/0283349 A1* | 11/2010 | Wolf .................. H02K 15/0442 310/195 |
| 2011/0099797 A1* | 5/2011 | Mishina ............. H02K 15/0478 29/596 |
| 2013/0342048 A1* | 12/2013 | Hogmark ........... H02K 15/0407 310/58 |
| 2014/0035423 A1 | 2/2014 | Veronesi et al. |

* cited by examiner

METHOD FOR FABRICATING BRUSHLESS MOTOR WINDINGS

RELATED APPLICATIONS

This regular utility non-provisional patent application claims priority benefit with regard to all common subject matter of earlier filed U.S. Provisional Patent Application titled "METHOD FOR FABRICATING BRUSHLESS MOTOR WINDINGS", Ser. No. 62/419,320, filed on Nov. 8, 2016, which is hereby incorporated by reference in its entirety into the present application.

BACKGROUND

Assembling motor coil windings in an efficient manner is an elaborate process that requires complicated and expensive precision robots. Even then, the coil windings are not wound in any organized manner and instead are simply bunched together. For motors that have central stator structure, stator teeth are often separate from a central armature and then attached to the central armature only after the windings are coiled onto the teeth to make stator assembly more manageable. This adds further complexity to the design and fabrication of the stator.

Furthermore, the windings are typically formed of coiled wires having a circular or hexagonal cross section. Circular wires pack together inefficiently and only touch each other at tangential points, which results in low electrical conductivity and poor heat conductivity due to the large air gaps between the wires. A conductive bonding agent can be used to fill in the air gaps and thus increase thermal conductivity, but inconsistent or incomplete air gap filling can result in hot spots. Imperfections such as stretches, twists, and kinks from coiling the wires also create hot spots, which can cause burnouts and electrical shorts. Hexagonal wires pack together more efficiently than circular wires, but hexagonal wires often form twists and kinks and hence are highly susceptible to the formation of hot spots, especially for small wire sizes. Thus, the power, performance, and reliability of conventional brushless electric motors is often limited by their windings.

SUMMARY

Embodiments of the present invention solve the above-described and other problems and limitations by providing improved methods for assembling windings of brushless electric motors.

In a first embodiment, a first winding may be positioned in winding gaps between stator teeth such that the first winding forms an "n" shape around every third tooth starting with a first tooth. A second winding is then positioned in the winding gaps between the stator teeth such that the second winding forms an "n" shape around every third tooth starting with a second tooth adjacent to the first tooth. Thus, the second winding is stacked on top of and offset by one tooth from the first winding. A third winding is then positioned in the winding gaps between the stator teeth such that the third winding forms an "n" shape around every third tooth starting with a third tooth adjacent to the second tooth. Thus, the third winding is stacked on top of and offset by one tooth from the second winding. As the windings encircle the central armature, they are wrapped around the central armature in an outward spiral such that each pass of the windings is stacked on a previous pass. The windings are then connected at their ends to dedicated three phase wires.

In a second embodiment, the windings are wrapped around a central longitudinal axis in a cylindrical shape having a plurality of annularly spaced positions (in lieu of stator teeth) such that the first winding forms an "n" shape around every third position starting with a first position. The second winding is wrapped around the central axis so as to form an "n" shape around every third position starting with a second position adjacent the first position with the second winding being stacked on top of the first winding. The third winding is wrapped around the central axis so as to form an "n" shape around every third position starting with a third position adjacent the second position with the third winding being stacked on top of the second winding. As the windings encircle the longitudinal axis, they are wrapped in an outward or inward spiral such that each pass of the windings is stacked on a previous pass. The windings are then connected at their ends to dedicated three phase wires.

In a third embodiment, a first layer is formed by placing a first series of n-shaped segments so that they pass up one side and down the opposite side of every other position, beginning with a first position. A second layer is formed by placing a second series of n-shaped segments so that they pass up one side and down the opposite side of every other position, beginning with a second position adjacent to the first position. Segments of the first layer are then connected to segments of the second layer so as to form three windings. The windings are offset from each other similar to the windings described above for cooperatively generating three electrical phases. As the windings encircle the central longitudinal axis, they are wrapped in an outward or inward spiral such that each pass of the windings is stacked on a previous pass. The windings are then connected at their ends to dedicated three phase wires.

In a fourth embodiment, a first layer is formed by placing a first series of n-shaped segments so that they pass up one side and down the opposite side of every other position, beginning with a first position. A second layer is formed by placing a second series of n-shaped segments so that they pass up one side and down the opposite side of every other position, beginning with a second position adjacent to the first position. A third layer is formed by placing a first series of u-shaped segments so that they pass down one side and up the opposite side of every other position, beginning with the second position. A fourth layer is formed by placing a series of u-shaped segments so that they pass down one side and up the opposite side of every other position, beginning with the first position. Segments of the first layer are then connected to segments of the second layer so as to form a first winding, a second winding, and a third winding. Segments of the third layer are connected to segments of the fourth layer so as to form a fourth winding, a fifth winding, and a sixth winding. The windings are offset from each other similar to the above-described windings. As the windings encircle the central longitudinal axis, they are wrapped in an outward or inward spiral such that each pass of the windings is stacked on a previous pass. The windings can also be wrapped in an inward spiral. The windings are then connected at their ends to dedicated three phase wires.

The above-described windings produce a magnetic field essentially identical to conventional windings. For example, conventional windings form individual solenoids per each winding coil. In contrast, the windings of the present invention form solenoids via the n-shape of one winding and the bottom portion between n-shapes of other windings (and/or the u-shape of one winding and the top portion between u-shapes of other windings). Importantly, the integral of all the component magnetic fields yields a total magnetic field essentially identical to conventional windings. It should also be noted that although the above embodiments utilize three-phase power, it will easily be understood that any number of phases such as 4, 6, and 18 phases may be implemented without undue experimentation.

The above-described methods provide several advantages. For example, they allow the windings to be cut or etched from thin metal sheets or printed circuit board (PCB) strips or formed via additive manufacturing. This can reduce a mass of the motor by over half and more than quadruple a power density of the motor. The windings can also stand alone without supporting structure, such as a central armature and stator teeth, which further reduces the motor mass and simplifies motor manufacturing.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

Figure 1:
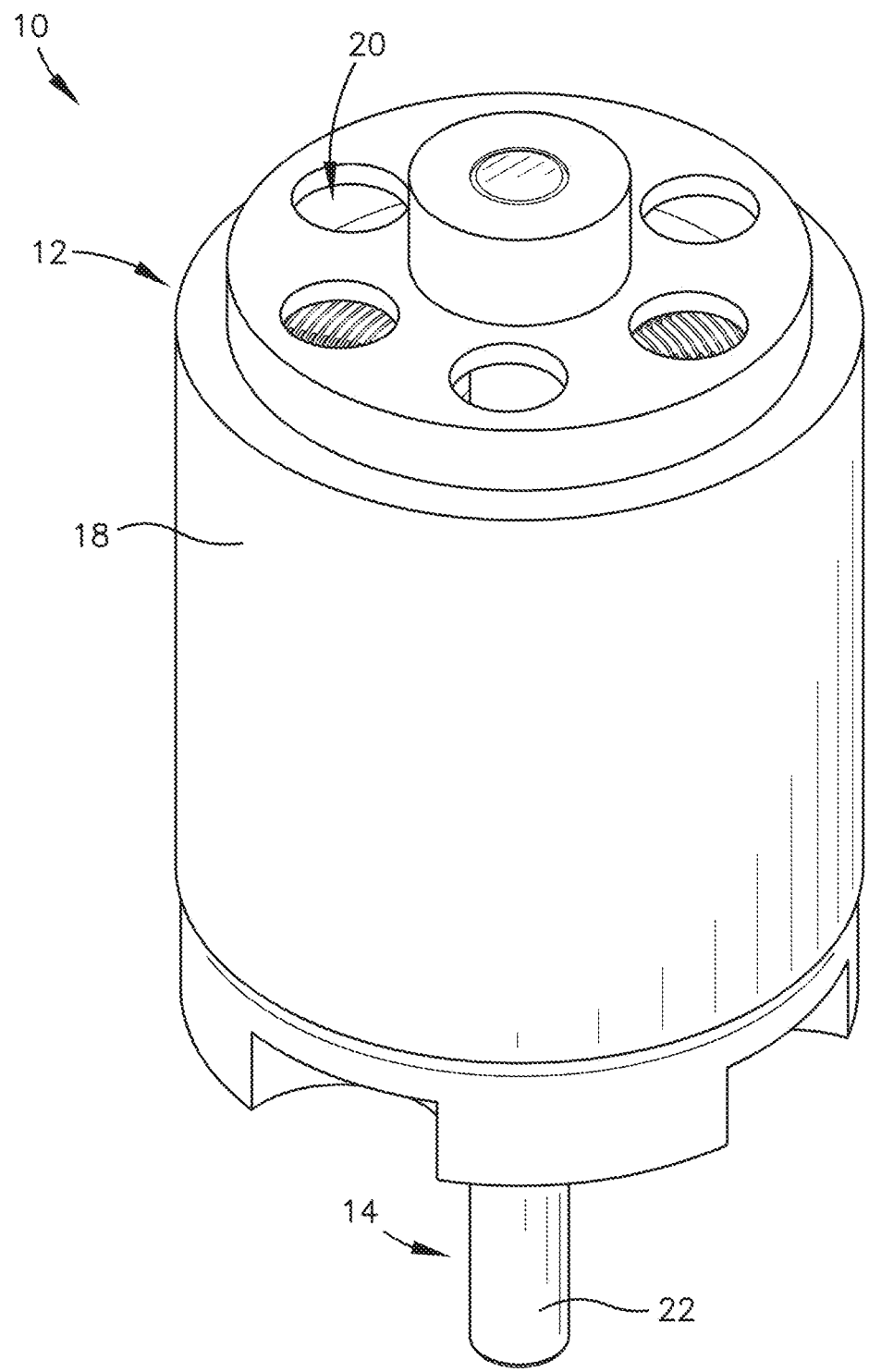
FIG. 1 is a perspective view of a brushless electric motor constructed in accordance with an embodiment of the invention.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular configurations of the present invention can include a variety of combinations and/or integrations of the embodiments described herein.

Turning to the drawing figures, and particularly FIGS. 1-6, a brushless electric motor 10 constructed in accordance with an embodiment of the present invention is illustrated. The brushless electric motor 10 broadly comprises a housing 12, a rotor 14, and a stator 16. The brushless electric motor 10 is a rotary motor but it will be understood that the invention encompasses other electromechanical devices such as linear motors, actuators, servo motors, polyphase transformers, and circuit board inductors.

The housing 12 encloses the rotor 14, stator 16, and other motor components and includes a cylindrical outer wall 18 having a plurality of ventilation openings 20 near an end or on a side thereof. The housing 12 may be a cast or machined metal shell for protecting the rotor 14, stator 16, and other motor components.

The rotor 14 rotates relative to the stator 16 and includes a plurality of magnets and an output shaft 22. The magnets are positioned annularly (i.e., in an outboard motor configuration) around the output shaft 22 and react to magnetic fields generated by the stator 16 so as to impart rotational forces on the output shaft 22. The rotor 14 may be supported on bearings or other low-friction connection points. It will be understood that the magnets may also be centrally located in an inboard motor configuration.

The stator 16 generates magnetic fields near the magnets of the rotor 14 and includes a central armature 24, a plurality of teeth 26, and a plurality of windings 28A-C. The central armature 24 supports the teeth 26 and forms an open-ended central shaft channel 30 for receiving the output shaft 22 of the rotor 14 therethrough. In other embodiments, however, an "air core stator" comprising only windings may be used.

The teeth 26 extend radially outwardly from the central armature 24 at their base ends 32 to their distal ends 34 and are annularly spaced from each other so as to form winding gaps 36 therebetween. The teeth 26 may widen from their base ends 32 to their distal ends 34 and may form flanges near their distal ends 34. The teeth 26 may also be elongated in a direction parallel to a longitudinal axis of the central armature 24 and may be equally spaced from each other. The teeth 26 may include twelve teeth as shown or any other suitable number of teeth and may be a monolithic piece with the central armature 24.

Figure 2:
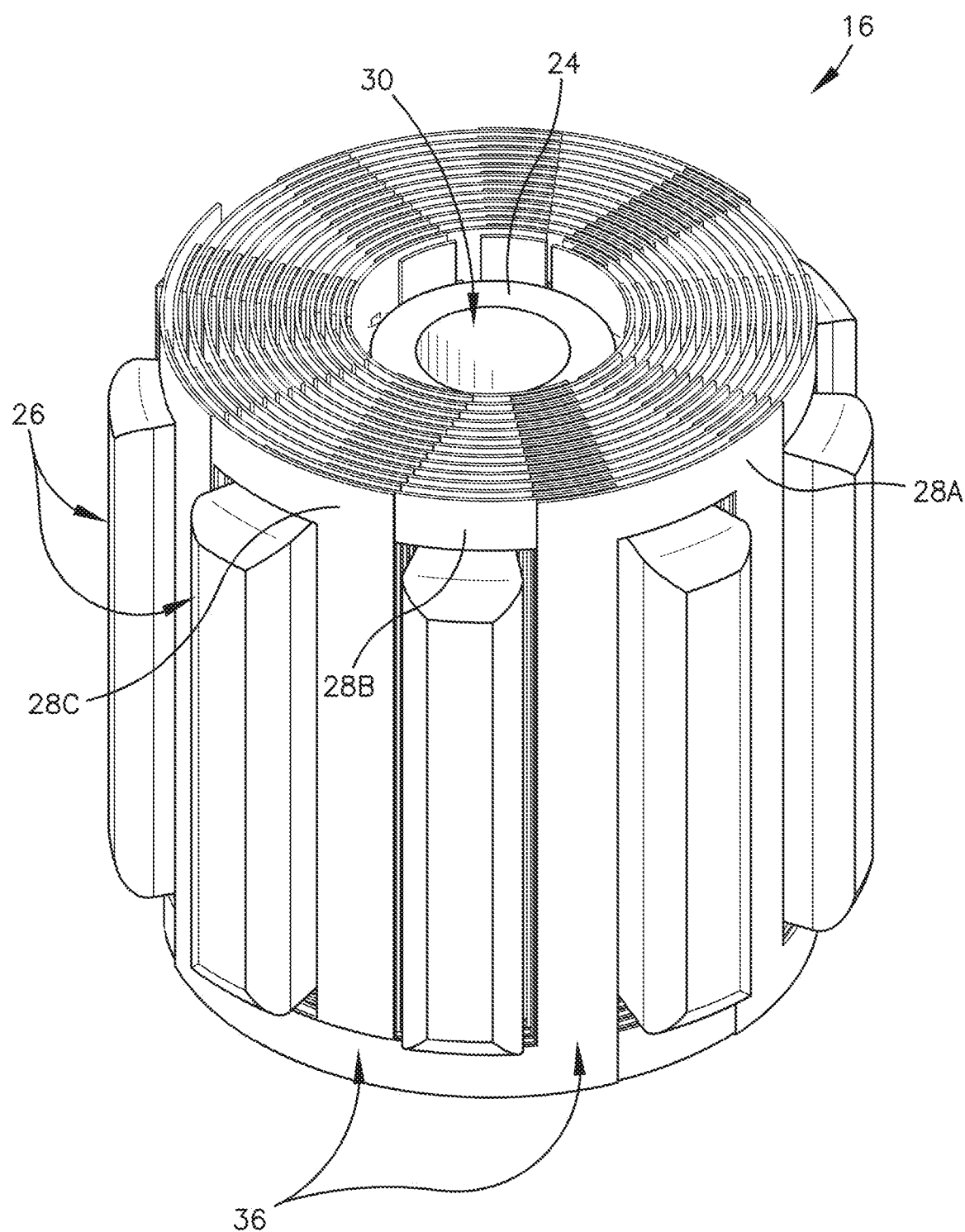
FIG. 2 is a perspective view of a stator of the motor of FIG. 1.
Figure 3:
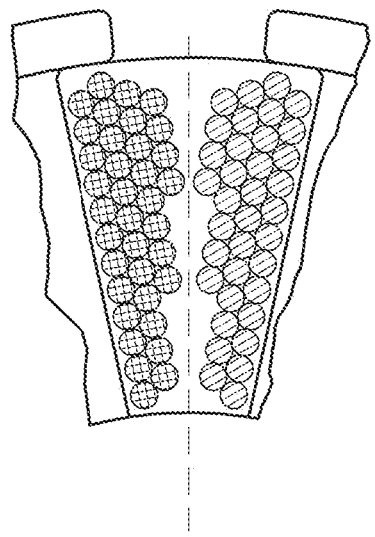
FIG. 3 is an end cutaway view of windings formed of circular cross section wires.
Figure 4:
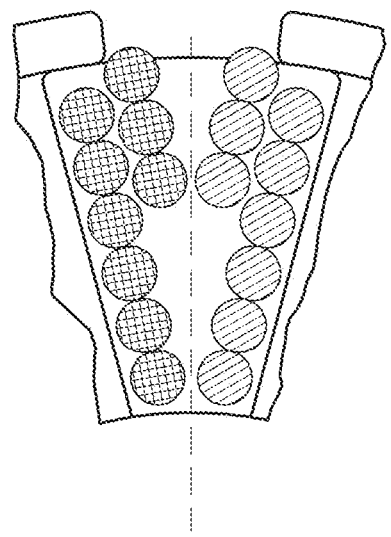
FIG. 4 is an end cutaway view of windings formed of other circular cross section wires.
Figure 5:
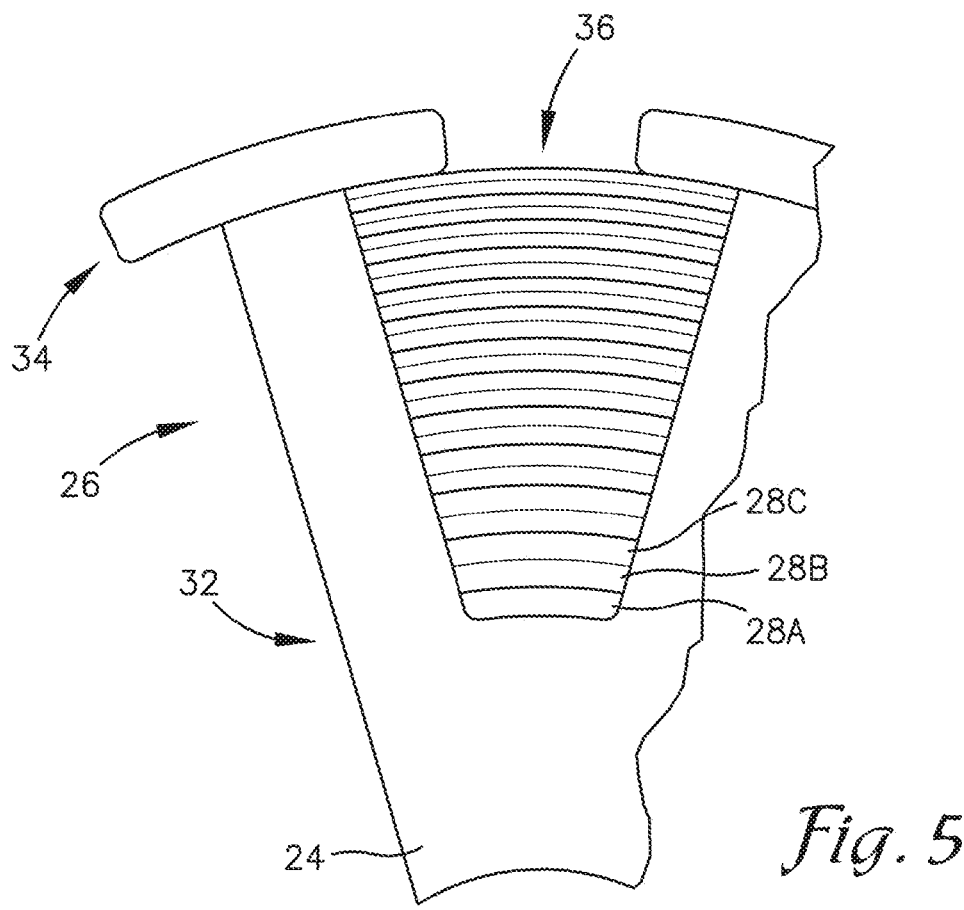
FIG. 5 is an end cutaway view of windings of the stator of FIG. 2.
Figure 6:
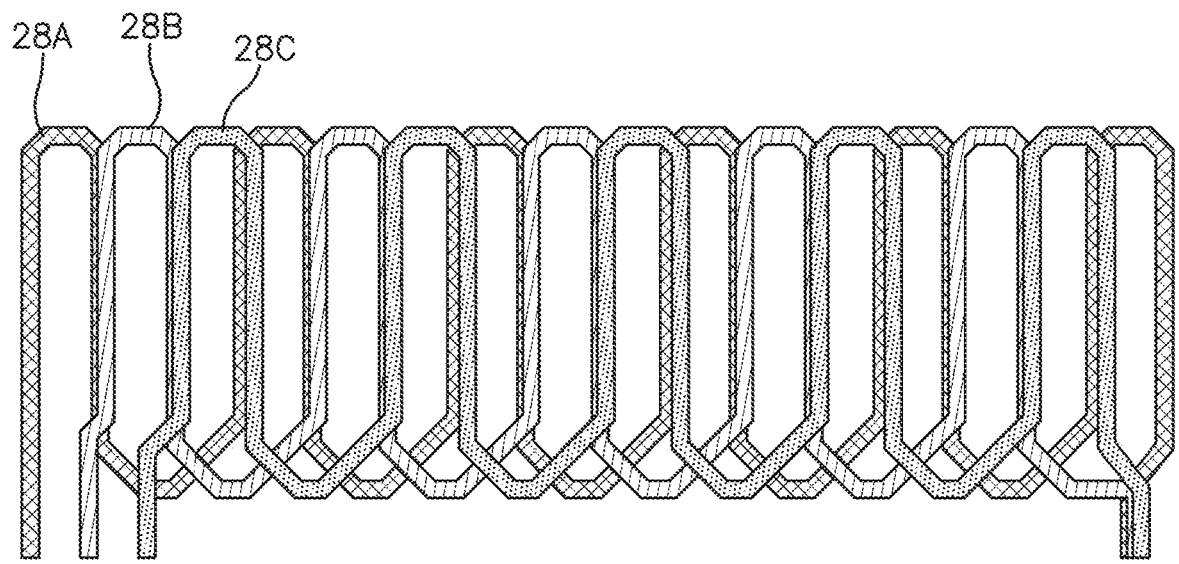
FIG. 6 is a schematic diagram of the windings of FIG. 2.

The windings 28A-C generate magnetic fields (or a collective magnetic field) near the rotor 14 and are wrapped around the central armature 24 so as to be radially stacked on top of each other in the winding gaps 36, as shown in FIGS. 2 and 5. The windings 28A-C pass between the teeth 26 in a zig-zag or back-and-forth shape as shown in FIGS. 2 and 6. Specifically, the first winding 28A passes up one side and down the opposite side of every third tooth beginning with a first tooth. The second winding 28B passes up one side and down the opposite side of every third tooth beginning with a second tooth adjacent to the first tooth. The third winding 28C passes up one side and down the opposite side of every third tooth beginning with a third tooth adjacent to the second tooth. That is, each winding 28A-C is offset from each other for cooperatively generating three electrical phases. As the windings 28A-C encircle the central armature 24, they form an outward spiral such that each pass of the windings 28A-C is stacked on a previous pass, as shown in FIG. 2. The windings 28A-C are connected together on one end so as to form a Y configuration, as shown in FIG. 6 (with reference to FIG. 9a).

The windings 28A-C may be narrower near the base ends 32 of the teeth 26 and wider near the distal ends 34 as shown in FIG. 5 and may be flat wire windings formed from thin metal sheets or printed circuit board (PCB) strips. For example, the windings 28A-C may be cut or etched from a metal sheet or formed on a flex strip. In another embodiment, the windings 28A-C are formed via additive manufacturing. The windings 28A-C may be made of copper or a non-copper material such as aluminum or any other suitable conductive material. The windings 28A-C may include a protective enamel or polyimide insulation and/or may be anodized.

The windings 28A-C may be assembled as follows. First, the first winding 28A may be positioned in the winding gaps 36 between the stator teeth 26 such that the first winding 28A forms an "n" shape around every third tooth starting with a first tooth. The second winding 28B is then positioned in the winding gaps 36 between the stator teeth such that the second winding 28B forms an "n" shape around every third tooth starting with a second tooth adjacent to the first tooth. Thus, the second winding 28B is stacked on top of and offset by one tooth from the first winding 28A. The third winding 28C is then positioned in the winding gaps 36 between the stator teeth such that the third winding 28C forms an "n" shape around every third tooth starting with a third tooth adjacent to the second tooth. Thus, the third winding 28C is stacked on top of and offset by one tooth from the second winding 28C. As the windings 28A-C encircle the central armature 24, they are wrapped around the central armature 24 in an outward spiral such that each pass of the windings 28A-C is stacked on a previous pass. The windings 28A-C are then connected at their ends to dedicated three phase wires. It will be understood, however, that other phases and electrical configurations can be used.

Importantly, and in a more general sense, the windings 28A-C may be assembled without reference to a central armature and stator teeth, such as for air core motors that do not have a central armature and stator teeth. In this case, the windings 28A-C are wrapped around a central longitudinal axis in a cylindrical shape having a plurality of annularly spaced positions (in lieu of teeth) such that the first winding 28A forms an "n" shape around every third position starting with a first position. The second winding 28B is wrapped around the central longitudinal axis so as to form an "n" shape around every third position starting with a second position adjacent the first position with the second winding being stacked on top of the first winding. The third winding 28C is wrapped around the central longitudinal axis so as to form an "n" shape around every third position starting with a third position adjacent the second position with the third winding being stacked on top of the second winding. As the windings 28A-C encircle the longitudinal axis, they are wrapped in an outward or inward spiral such that each pass of the windings 28A-C is stacked on a previous pass.

The brushless electric motor 10 and method for assembling the windings 28A-C provide several advantages. For example, by wrapping the windings 28A-C around the central armature 24 or around a central longitudinal axis of the motor 10 in a cylindrical shape (i.e., by forming a pattern of spaced apart "n" shapes), the motor 10 may be less than half the mass with over four times the power density of conventional motors. To that end, the windings 28A-C may be cut or etched from a metal sheet or formed on a flex strip or via other PCB manufacturing techniques. The windings 28A-C and even the entire motor 10 may also be formed via additive manufacturing. The windings 28A-C may be implemented in any standard phase configuration such as a Y configuration, a Delta configuration, and a Delta with taps configuration. The windings 28A-C generate almost identical magnetic fields as conventional windings and can have any suitable electromagnetic gearing.

In the case of flat wire windings, the windings 28A-C may have a larger cross-sectional area than conventional stator wires and have optimal geometry for maximum electrical conductivity and maximum thermal conductivity. This allows for the windings 28A-C to be made from aluminum, which reduces the mass of the motor 10 and is especially advantageous for applications in which weight is prioritized over volume. The windings 28A-C also allow for thinner insulation, which in turn allows for more wire cross sectional area available electrical conduction. The windings 28A-C do not have air gaps and do not form imperfections such as stretches, twists, and kinks, which results in fewer hotspots.

In the case of a motor 10 having a stator 16 including a central armature 24 and teeth 26, the windings 28A-C are neatly stacked on top of each other in the windings gaps 36 between the teeth 26 instead of being crudely bunched together and wedged onto the teeth 26. The teeth 26 also do not need to be separate from the central armature 24 to efficiently assemble the windings 28A-C, which simplifies stator design and eliminates several manufacturing steps.

Figure 7:
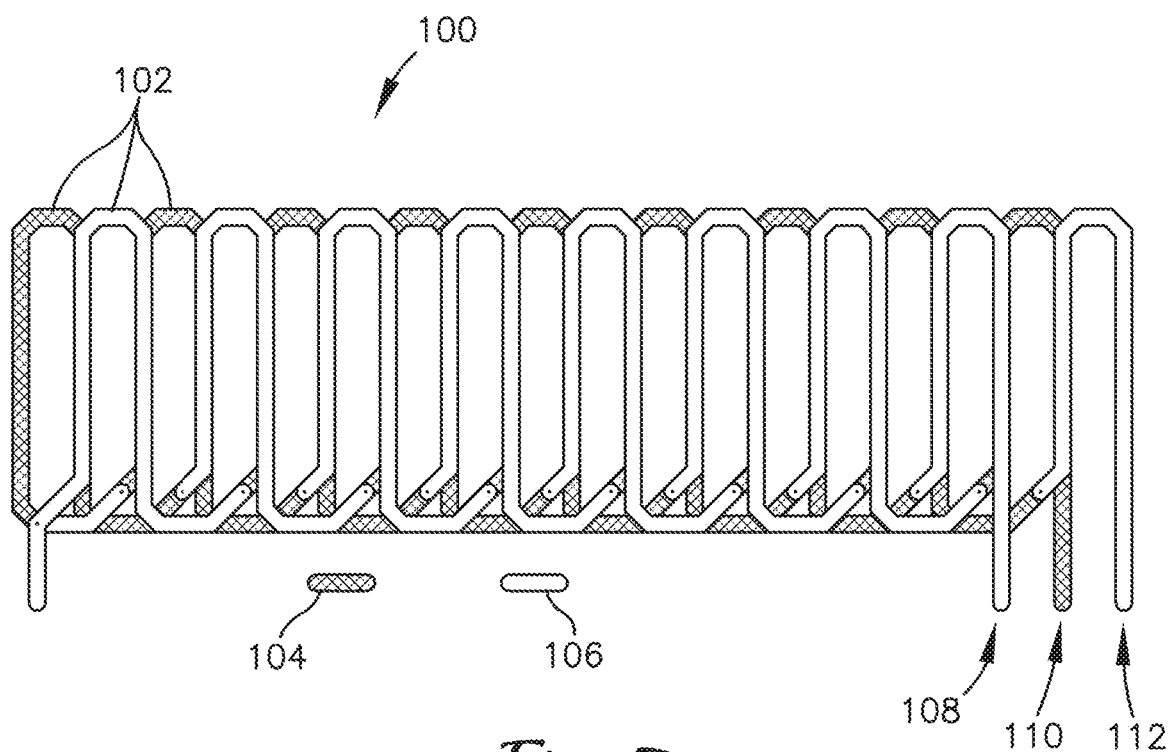
FIG. 7 is a schematic diagram of windings constructed in accordance with another embodiment of the invention.
Figure 9C:
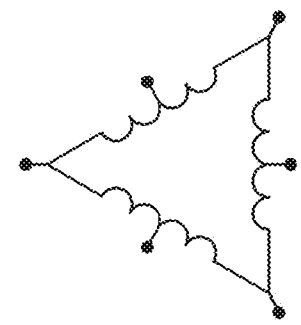
FIG. 9c is an electrical schematic diagram of a Delta with taps winding configuration.
Figure 9B:
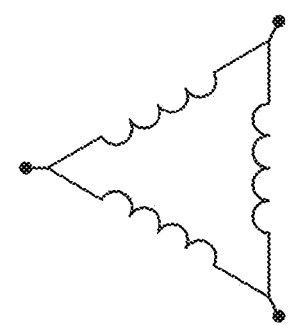
FIG. 9b is an electrical schematic diagram of a Delta winding configuration.
Figure 9A:
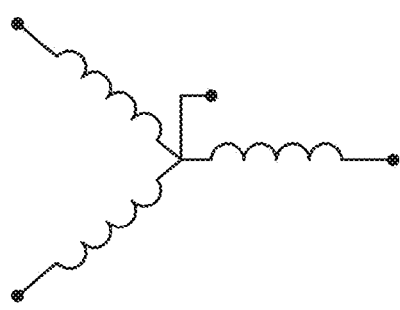
FIG. 9a is an electrical schematic diagram of a Y winding configuration.

Turning to FIG. 7 and with reference to FIG. 9a, a winding assembly 100 constructed in accordance with another embodiment of the invention will now be described. The winding assembly 100 is similar to the windings 28A-C described above except that the winding assembly 100 includes a plurality of winding segments 102 alternating between a first layer 104 (shown as a lower layer) and a second layer 106 (shown as an upper layer).

The first layer 104 is formed of a first series of n-shaped segments 102 passing up one side and down the opposite side of every other position (or tooth), beginning with a first position. The second layer 106 is formed of a second series of n-shaped segments 102 passing up one side and down the opposite side of every other position, beginning with a second position adjacent to the first position. Segments of the first layer 104 are connected to segments of the second layer 106 so as to form a first winding 108, a second winding 110, and a third winding 112. The windings 108-112 are offset from each other similar to the windings 28A-C described above for cooperatively generating three electrical phases. As the windings 108-112 encircle the longitudinal axis, they are wrapped in an outward or inward spiral such that each pass of the windings 108-112 is stacked on a previous pass. The winding assembly 100 forms a Y configuration (see FIG. 9a) similar to the Y configuration formed by the windings 28A-C.

Figure 8:
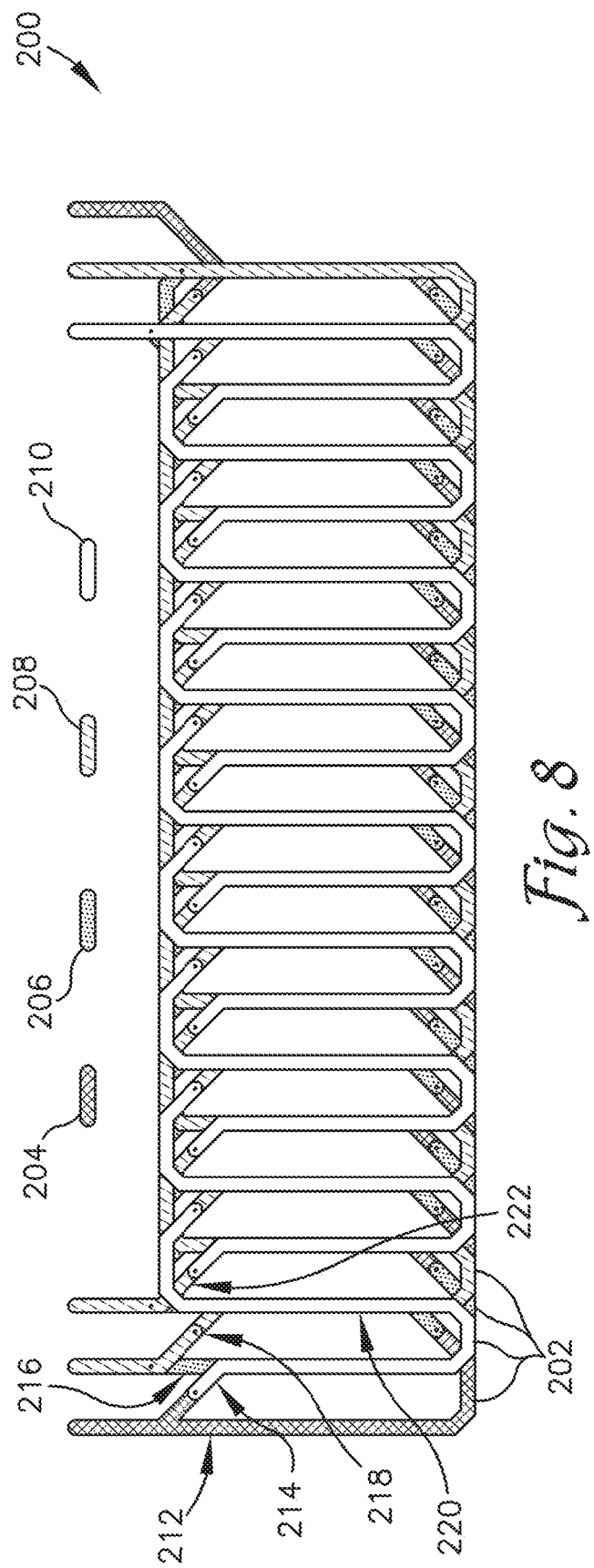
FIG. 8 is a schematic diagram of windings constructed in accordance with yet another embodiment of the invention.

Turning to FIG. 8 and with reference to FIG. 9c, a winding assembly 200 constructed in accordance with yet another embodiment of the invention will now be described. The winding assembly 200 is similar to the winding 100 described above except that the winding assembly 200 includes a plurality of winding segments 202 alternating between a first layer 204 (shown as a bottom layer), a second layer 206, a third layer 208, and a fourth layer 210 (shown as a top layer).

The first layer 204 is formed of a first series of n-shaped segments 202 passing up one side and down the opposite side of every other position (or tooth), beginning with a first position. The second layer 206 is formed of a second series of n-shaped segments 202 passing up one side and down the opposite side of every other position, beginning with a second position adjacent to the first position. The third layer 208 is formed of a first series of u-shaped segments 202 passing down one side and up the opposite side of every other position, beginning with the second position. The fourth layer 210 is formed of a series of u-shaped segments 202 passing down one side and up the opposite side of every other position, beginning with the first position. Segments of the first layer 204 are connected to segments of the second layer 206 so as to form a first winding 212, a second winding 214, and a third winding 216. Segments of the third layer 208 are connected to segments of the fourth layer 210 so as to form a fourth winding 218, a fifth winding 220, and a sixth winding 222. The windings 212-222 are offset from each other similar to the windings 28A-C and windings 108-112. As the windings 212-222 encircle the longitudinal axis, they are wrapped in an outward or inward spiral such that each pass of the windings 212-222 is stacked on a previous pass. The winding assembly 200 forms a Delta configuration with taps (see FIG. 9c).

The above-described windings produce a magnetic field essentially identical to conventional windings. For example, conventional windings form individual solenoids per each winding coil. In contrast, the windings of the present invention form solenoids via the n-shape of one winding and the bottom portion between n-shapes of other windings (and/or the u-shape of one winding and the top portion between u-shapes of other windings). Importantly, the integral of all the component magnetic fields yields a total magnetic field essentially identical to conventional windings. It should also be noted that although the above embodiments utilize three-phase power, it will easily be understood that any number of phases such as 4, 6, and 18 phases may be implemented without undue experimentation.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A method of assembling windings for a brushless motor including a plurality of stator teeth each having a base end and a distal end, the method comprising:
   stacking a narrowest portion of a first winding around a central longitudinal axis in a cylindrical shape having a plurality of annularly spaced positions such that the first winding reverses longitudinal direction around every third position of the first winding starting with a first position of the first winding;
   stacking a narrowest portion of a second winding around the longitudinal axis such that the second winding reverses longitudinal direction around every third position of the second winding starting with a second position of the second winding adjacent the first position of the first winding;
   stacking a narrowest portion of a third winding around the longitudinal axis such that the third winding reverses longitudinal direction around every third position of the third winding starting with the third position of the third winding adjacent the second position of the second winding;
   stacking progressively wider portions of the first winding, the second winding, and the third winding on previously stacked portions of the first winding, the second winding, and the third winding; and
   stacking widest portions of the first winding, the second winding, and the third winding on the previously stacked portions of the first winding, the second winding, and the third winding so as to form an outward spiral with the narrowest portions of the first winding, the second winding, and the third winding being closer to the base ends of the plurality of stator teeth and the widest portions of the first winding, the second winding, and the third winding are closer to the distal ends of the plurality of stator teeth.

2. The method of claim 1, wherein the brushless motor includes a stator having a central armature and the plurality of stator teeth are spaced apart and extending radially from the annularly spaced positions such that winding sections of the first, second, and third windings pass through winding gaps between adjacent teeth of the plurality of stator teeth.

3. The method of claim 1, wherein the first, second, and third windings are flat wire windings.

4. The method of claim 3, further comprising cutting or etching the flat wire windings from a metal sheet.

5. The method of claim 3, further comprising forming the flat wire windings via PCB manufacturing.

6. The method of claim 3, wherein the flat wire windings are formed on a flex strip.

7. The method of claim 1, further comprising forming the first, second, and third windings via additive manufacturing.

* * * * *